United States Patent

McMurray

[15] 3,678,367

[45] July 18, 1972

[54] VERSATILE POWER CONVERTERS WITH A HIGH FREQUENCY LINK

[72] Inventor: William McMurray, Schenectady, N.Y.

[73] Assignee: General Electric Company

[22] Filed: May 26, 1971

[21] Appl. No.: 146,863

[52] U.S. Cl. .......................................321/7, 321/60, 321/69, 330/10

[51] Int. Cl. .......................................................H02m 5/30

[58] Field of Search ...........................321/7, 60, 69; 330/10

[56] References Cited

UNITED STATES PATENTS

| | | | |
|---|---|---|---|
| 3,487,289 | 12/1969 | McMurray | 321/45 |
| 3,517,300 | 6/1970 | McMurray | 321/60 |
| 3,564,390 | 2/1971 | Stratton | 321/60 |
| 3,582,756 | 6/1971 | McMurray | 321/7 |

*Primary Examiner*—William M. Shoop, Jr.
*Attorney*—John F. Ahern, Paul A. Frank, Julius J. Zaskalicky, Donald R. Campbell, Frank L. Neuhauser, Oswald B. Waddell and Joseph B. Forman

[57] ABSTRACT

A power converter circuit with a high frequency transformer or capacitor link between input and output switching circuits is operated by a control computer to provide voltage, frequency, and phase conversion and regulation. Each switching circuit has a plurality of solid state switches establishing multiple circuit paths from the input to the output terminals through the single phase high frequency link by conduction of different combinations of switches. Selected combinations of switches are fired synchronously at a high frequency switching rate to generate a series of energy transfer pulses. The control computer operates immediately in advance of each energy transfer pulse to calculate the net effective error, according to a predetermined criterion, between the instantaneous predicted output voltage (or current) and the desired or reference output voltage for each possible combination of switches. The combination that produces the minimum net effective error is selected and fired next. Single phase AC, polyphase AC, and DC input and output switching circuit configurations can be combined as desired.

37 Claims, 18 Drawing Figures

INVENTOR
WILLIAM McMURRAY
BY [signature]
HIS ATTORNEY

| THYRISTOR SYNCHRONOUS FIRING OPTIONS | | | | | | | | | | |
|---|---|---|---|---|---|---|---|---|---|---|
| COMBINATION NUMBER | 0 | 1 | 2 | 3 | 4 | 5 | 6 | 7 | 8 | 9 |
| INPUT LINE | NONE | A | A | A | B | B | B | C | C | C |
| OUTPUT LINE | NONE | A' | B' | C' | A' | B' | C' | A' | B' | C' |

INVENTOR
WILLIAM McMURRAY
BY [signature]
HIS ATTORNEY

INVENTOR
WILLIAM McMURRAY
BY [signature]
HIS ATTORNEY

INVENTOR
WILLIAM McMURRAY
BY
HIS ATTORNEY

INVENTOR
WILLIAM McMURRAY
BY [signature]
HIS ATTORNEY

INVENTOR
WILLIAM McMURRAY
BY
HIS ATTORNEY

INVENTOR
WILLIAM McMURRAY
BY Donald R. Campbell
HIS ATTORNEY

INVENTOR
WILLIAM McMURRAY
Donald R. Campbell
HIS ATTORNEY

INVENTOR
WILLIAM McMURRAY
BY Donald R. Campbell
HIS ATTORNEY

VERSATILE POWER CONVERTERS WITH A HIGH FREQUENCY LINK

BACKGROUND OF THE INVENTION

This invention relates to versatile solid state power converters with a high frequency link that are controlled to provide voltage, frequency, and phase conversion and regulation. Another aspect of the invention is a method of controlling the combination and sequence of rendering conductive the solid state switches in such converters to produce the desired output waveform.

Related single phase power converter circuits with a high frequency transformer link are described in U.S. Pat. No. 3,564,390, granted to Jerry L. Stratton, and in the inventor's U.S. Pat. No. 3,517,300, granted June 23, 1970 and U.S. Pat. No. 3,487,289, granted Dec. 30, 1969. These power converters basically comprise input and output switching circuits at either side of a high frequency coupling transformer that convert an alternating or unidirectional input voltage to a high frequency wave which is transformed and reconstructed at the output with the same frequency. The input voltage typically has a low frequency in the range of 0–400 Hz and the transformer link operates at a relatively high frequency such as 10 kHz. A significant reduction in the size of the transformer is therefore made possible, and the solid state switches can be controlled to obtain other features such as current limiting, current interruption, and voltage regulation. The converters use the same switching sequence for resistive and reactive loads and for reversible power flow to return power to the supply.

Another allowed application by the present inventor, Ser. No. 10,804, filed Feb. 12, 1970, and now U.S. Pat. No. 3,582,756, discloses similar circuits suitable for energization by a polyphase alternating current source, to produce a transformed polyphase output with the same low frequency or a rectified output. The polyphase power converters are characterized by a time shared single phase high frequency coupling transformer. The switches in the input and output circuits are rendered conductive synchronously and in predetermined fixed sequence to produce a series of high frequency voltage pulses that are transformed sequentially and reformed at the output terminals. The thyristor polyphase converters, as well as the thyristor version of the single phase power converters covered by U.S. Pat. No. 3,487,289, employ a form of series capacitor commutation to achieve turn-off of the conducting thyristors. Commutation is effective over the entire range of an AC voltage source for a variety of load current requirements.

The present invention extends the versatility of this high frequency link circuit family, commonly referred to as the single phase and polyphase electronic transformer circuits, to achieve frequency, voltage, and phase conversion and regulation. The power circuits in some forms of this invention may be identical or equivalent to those shown in the prior-filed allowed application and patents, however a different technique for controlling the switches is used to obtain the improved, more versatile performance. The computer-type control circuit for producing the desired conversion inherently achieves regulation of the output waveform without the need for additional special control circuitry. The preferred embodiments, for example, are identical or equivalent to the single phase, transformer-coupled, polyphase input-polyphase output converter shown in FIG. 3 of U.S. Pat. No. 3,582,756, which is implemented with series capacitor commutated thyristors. However, the present circuits achieve frequency conversion and regulation as well as voltage control and regulation. Other combinations of input and output circuits not previously taught achieve phase conversion and regulation as well.

SUMMARY OF THE INVENTION

The new multi-purpose power converter circuit comprises first and second switching circuits with a single phase high frequency transformer or capacitor link therebetween connected respectively to a set of first terminals in which appears a low frequency AC or unidirectional electric potential and to a set of second terminals at which a desired low frequency AC or unidirectional output waveform formed. Each switching circuit comprises a plurality of solid state switches to establish multiple circuit paths from one set of terminals to the other through the high frequency link by simultaneous conduction of different combinations of the solid state switches. Control means for the converter circuit synchronously and sequentially renders conductive selected combinations of switches, and operates the switching circuits at a high frequency switching rate to generate a series of energy transfer pulses. The control means includes a control computer with computation and selector circuits for determining the selected combinations to be fired. The computation circuit calculates, for the different combinations of switches, the net effective error according to a predetermined criterion between the instantaneous predicted output waveform (voltage or current) and the desired or reference output waveform, and the selector circuit determines the selected combination with the minimum effective error. The computation circuits are based on the minimum error criterion, such as the least sum of errors-squared or least sum of absolute errors, and the circuit equations for the expected output waveform. The control computer operates in advance of each energy transfer pulse using input data obtained by sensing devices such as instrument transformers connected in the switching circuits. A method of controlling these power converters in general expresses this sequence of steps.

The input and output switching circuit configuration depends on the available supply potential and the desired output waveform. Single phase AC, polyphase AC, and DC switching circuits can be combined as required. Frequency, phase, and voltage conversion and regulation are obtained in any combination depending on the converter configuration. Regulation is inherent because the output follows the reference output waveform supplied to the control computer. By changing the reference the output waveform is made adjustable. The power converters are particularly suitable to be constructed with bidirectional conducting thyristor means such as inverse-parallel pairs of thyristors, and with a series capacitor commutation circuit. The control computer operates during the required turn-off period for the thyristors between consecutive half sinusoidal current pulses to determine the next selected combination of switches to be fired, including the option of firing none of the switches. One preferred embodiment of the invention uses series capacitor commutated thyristors in a three phase input-three phase output configuration. Another embodiment uses the same type switches and commutation in a single phase AC or DC input circuit and a three phase output circuit with dual output path options.

DESCRIPTION OF THE PREFERRED EMBODIMENTS

Figure 1:
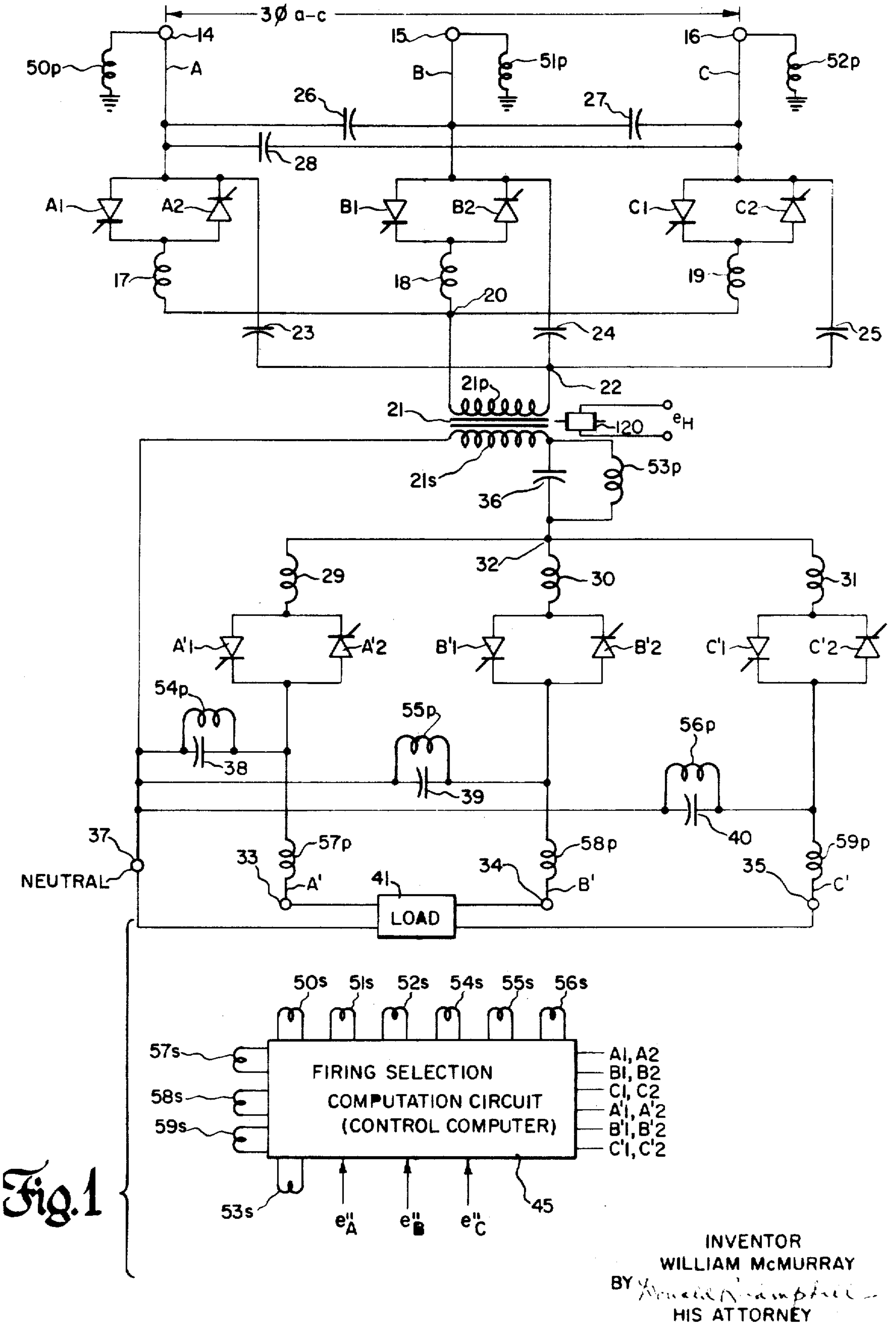
FIG. 1 is a detailed circuit diagram of the preferred embodiment of the invention in a polyphase circuit configuration using series capacitor commutated thyristors and a single phase high frequency linear coupling transformer, showing in block diagram form the new firing selection computation circuit for controlling the thyristor switches.

The new multi-purpose power converters with a high frequency single phase transformer or capacitor link can be constructed in many circuit configurations using a variety of solid state switching devices, as will be discussed. For purposes of illustration, the invention is explained in detail with regard to the polyphase transformer-linked power converter in FIG. 1, and the equivalent polyphase capacitor-linked power converter in FIG. 2, both implemented with thyristors. The circuits convert a low frequency three-phase supply voltage to a regulated three-phase output voltage with a different low frequency, either higher or lower than the input frequency, and the desired amount of voltage conversion. In FIG. 1 input terminals 14–16 are connected to a low frequency, three-phase alternating current source, commonly having a frequency in the range of 50–400 Hz. The input circuit solid state switches have bidirectional conducting characteristics and comprise pairs of inverse-parallel connected thyristors, one pair for each phase, identified as A1 and A2, B1 and B2, and C1 and C2. The three pairs of inverse-parallel thyristors are respectively connected in series with commutating inductors 17–19 and are further wye-connected between input terminals 14–16 and common point 20. One terminal of the primary winding 21*p* of a high frequency linear coupling transformer 21 is connected to point 20, while the other terminal 22 is coupled to the junction of three wye-connected commutating capacitors 23–25 that are connected between input terminals 14–16 and terminal 22. Commutating inductors 17–19 and capacitors 23–25 are part of the series capacitor commutation circuit, the remaining commutation components being in the output circuit. To provide a stiff voltage source, three input filter capacitors 26–28 are delta-connected between the input terminals. For some types of voltage sources, input filter capacitors may not be required.

The output switching circuit can be identical to the input switching circuit or different, and is here shown in a configuration with a single commutating capacitor and a neutral terminal. The three inverse-parallel pairs of thyristors A'1 and A'2, B'1 and B'2, and C'1 and C'2, are respectively connected in series with commutating inductors 29–31 and wye-connected between common point 32 and output terminals 33–35. The single commutating capacitor 36 is coupled between point 32 and one terminal of the secondary winding 21*s* of high frequency linear coupling transformer 21. The remaining terminal of secondary transformer winding 21*s* is coupled directly to neutral terminal 37. Output filter capacitors 38–40 are essential to the operation of this circuit, and are shown wye-connected between neutral terminal 37 and the other output terminals 33–35. A three-phase resistive or reactive load 41, typically a load with inductive characteristics, is connected between the output terminals.

Some general features of the operation of this type of power converter circuit will be discussed before proceeding to the new control circuit and method for controlling the converter. The thyristor switches in the input and output circuits are preferably silicon controlled rectifiers. These unidirectional conducting thyristors are easily switched from a blocking to a conducting condition by the application of a gating signal to the gate electrode, but are difficult to commutate off or return to the blocking condition because of the necessity of reducing the current through the device to zero and applying a reverse voltage for a short period of time greater than the required turn-off period. One selected complementary pair of thyristors in each of the input and output circuits are gated synchronously and are commutated off by the series capacitor commutation circuits after an interval of conduction determined by the resonant frequency of the series resonant circuit. Thereafter, another thyristor pair in each of the input and output circuits is turned on and commutated off after the same interval of conduction, thereby time-sharing the single phase high frequency coupling transformer 21 and delivering sequential energy pulses to load 41. The switching rate is relatively high as compared to the low frequency source voltage, preferably 10 kHz or more, to make possible the use of a small, efficient coupling transformer 21. At this high switching frequency, the source voltage appears to the conducting thyristors as a direct current source. Assuming for example that thyristors A1, A2, and A'1, A'2 are gated synchronously, the equivalent series resonant commutation circuit that is energized has a total equivalent commutating capacitance determined by commutating capacitors 23–25 (each C1) in series with commutating capacitor 36 (C2). For a unity transformer turns ratio, the total equivalent commutating capacitance is $$C_{eff} = \frac{3C1 \cdot C2}{3C1 + C2} . \tag{1}$$

In the same manner, the total equivalent commutating inductance comprises commutating inductor 17 (L1) in series with commutating inductor 29 (L2). Thus, $L_{eff} = L1 + L2$. The duration of the half sinusoidal current pulse in the equivalent series resonant circuit is $\pi \sqrt{C_{eff} L_{eff}}$ seconds. Commutation of the conducting thyristors after the half sinusoidal current pulse has ended occurs when the current in the circuit attempts to reverse and the commutating capacitors are charged to reverse bias the thyristors. The thyristors cease to conduct and fully recover following the turn-off period $t_o$, typically 10 microseconds. Only two of the four thyristors are conducting at one time, according to the circuit configuration, and the option is available of gating or firing only those two thyristors rather than all four as previously explained. The foregoing analysis is clearer by referring to the equivalent circuit of FIG. 2, in which coupling capacitor 42 ($C_c$) has the dual function of being the high frequency link and the commutating capacitor. The substitution of coupling capacitor 42 for coupling transformer 21, to provide the high frequency link, may be desired in circuits where voltage transformation or isolation is not required.

Further information on the operation of the series capacitor commutation circuit is given in the aforementioned U.S. Pat. No. 3,487,289 and U.S. Pat. No. 3,582,756. For proper operation, the output filter capacitors 38–40 ($C_o$) and also the input filter capacitors 26–28 ($C_i$) are a magnitude larger than the combined coupling and commutation capacitor 42. The operation of the circuit is the same regardless as to the type of load, including a regenerative type load that feeds power into the supply lines, since power flow can be from the input to the output side or from the output to the input side. The circuit conditions determine the direction of transfer of an energy pulse each time a complementary pair of switches on each side of the high frequency link are fired and then commutated off.

Figures 2, 3:
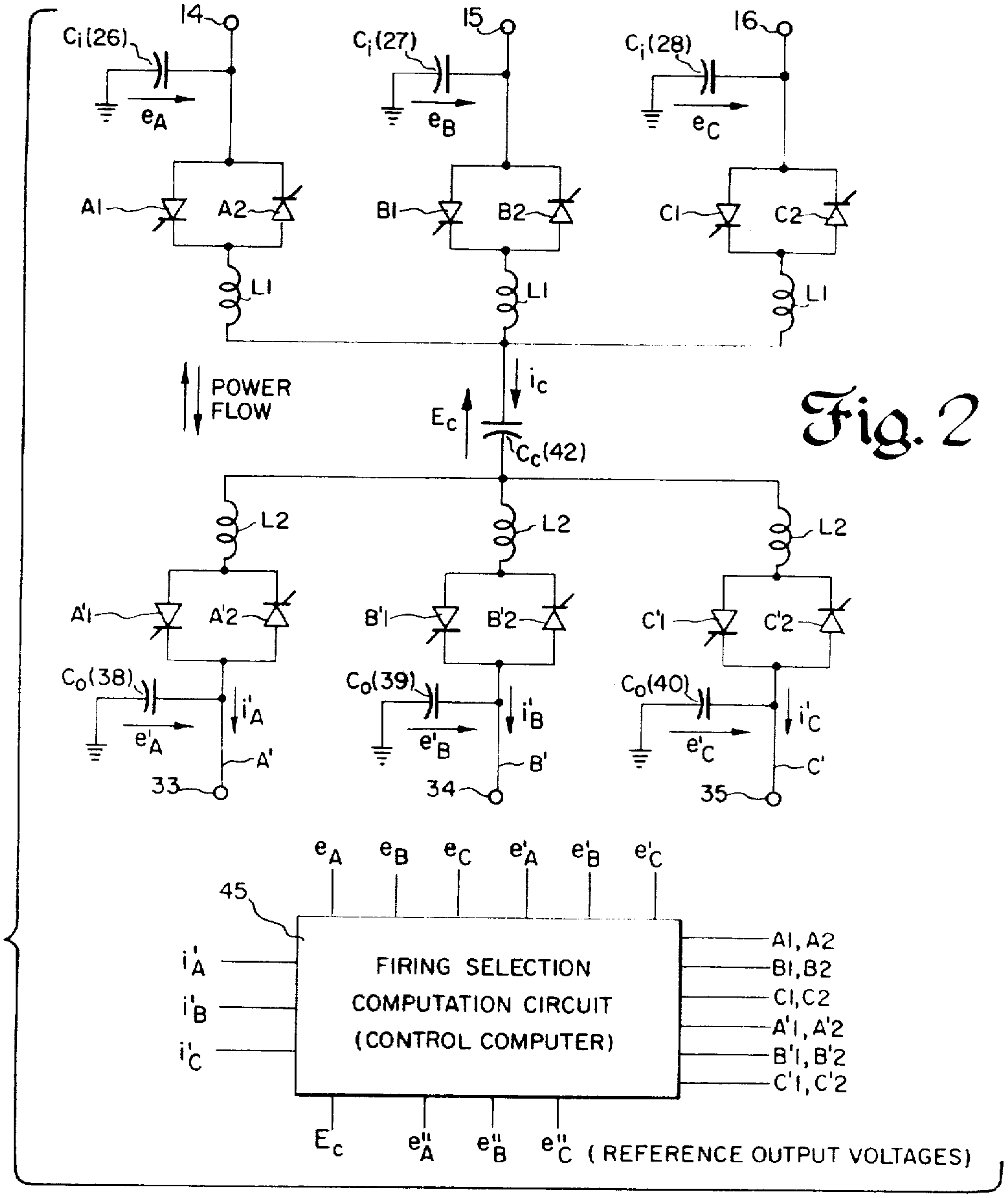
FIG. 2 is an equivalent circuit diagram for the FIG. 1 power circuit which also illustrates the modification of using a coupling capacitor in the high frequency link in place of the single phase transformer.
FIG. 3 is a table giving the ten thyristor firing options for synchronously rendering conductive the thyristors connecting the indicated output and input lines, or firing none of the thyristors.

The FIG. 1 and FIG. 2 power converters and other embodiments of the invention can be implemented with a variety of solid state switches or solid state switching means of different types, but preferably thyristor type switches are used. In order to deal with alternating current potentials, the switches must have bidirectional conducting characteristics, obtained by using a bilateral device such as the triac or diac, or a pair of unilateral devices such as two silicon controlled rectifiers connected in inverse-parallel, or a single device connected in a diode bridge. Within the broad scope of the invention, it is also possible to use controlled turn-off switches such as the transistor and the gate turn-off thyristor which are rendered non-conductive by control of the signal applied to a control electrode. Although the use of a commutating circuit with controlled turn-off switches is not essential, it has been found that commutation circuits such as the series capacitor commutation herein disclosed are helpful in turning off these devices. The advantage of this series capacitor commutation technique is that the commutation circuit for the switches is incorporated in the power circuit and no auxiliary commutation components are required.

In order to obtain adjustable frequency and voltage conversion and regulation, the present invention employs a thyristor firing selection computation circuit or control computer 45 for controlling the power converter circuit. The operation of firing selection computation circuit 45 is based on the recognition that each inverse-parallel pair of thyristors in the input circuit can be fired synchronously with any one of the inverse-parallel pairs of thyristors in the output circuit, and that the various combinations of these synchronously fired thyristors produce energy pulses of different magnitudes for transfer from one side to the other. The general control strategy is to render conductive the combination of thyristors that will produce an energy transfer pulse in a direction to make the actual output quantities, either voltage or current, closer to their desired values. More specifically, the strategy is to select from among all the possible thyristor firing combinations the particular combination of thyristors which produces an energy transfer pulse that minimizes the net effective error, according to some predetermined criterion, between the desired output waveform and the expected output waveform. For a single output, as in a single phase or DC output, a suitable net effective error criterion is the absolute magnitude of the error. For multiple outputs, such as a three-phase output, the net effective error criterion can be the sum of the absolute magnitudes of the three individual errors, or is preferably the sum of the squares of the three individual errors. The latter least-squares error criterion is generally acknowledged to give a best statistical fit between the actual and desired output waveforms. Any other suitable net effective error criterion can be used in the practice of the invention.

With reference to the three phase input-three phase output power converters of FIGS. 1 and 2, the thyristor synchronous firing options are the ten combinations given in the table of FIG. 3 including in general the option of firing no thyristors at all. It is understood that all four thyristors connecting the indicated input and output lines conduct synchronously for equal intervals. Each combination energizes a series resonant circuit connecting the source and the output sink voltages. The magnitude of the half sinusoidal pulse of current that flows is directly proportional to the algebraic sum around the circuit of the source voltage, sink voltage, and initial total equivalent capacitor voltage, and is inversely proportional to the characteristic impedance $\sqrt{L_{eff}/C_{eff}}$ of the complete series circuit. The general control method is to determine the circuit equation for the predicted output voltage or current for each combination during the next succeeding energy pulse transfer period, measure the required circuit parameters to solve the equations, and compute the net effective error between the predicted voltage (or current) and a desired voltage (or current). Then the individual net effective errors are compared according to the predetermined criterion, the combination that produces the minimum net effective error is selected, and gating or firing signals for the selected thyristors are generated. This control method is repeated in advance of each of the successive energy transfer pulse periods, preferably during the thyristor turn-off period $t_o$ or possibly during the immediately preceding energy transfer pulse. The preferred technique is that the thyristor selection process is repeated for every prospective energy transfer pulse, one "move" at a time. A modification is a selection process which considers several "moves" ahead. This would give better overall results, but is considerably more complex as in the analogous chess situation.

Figure 4A:
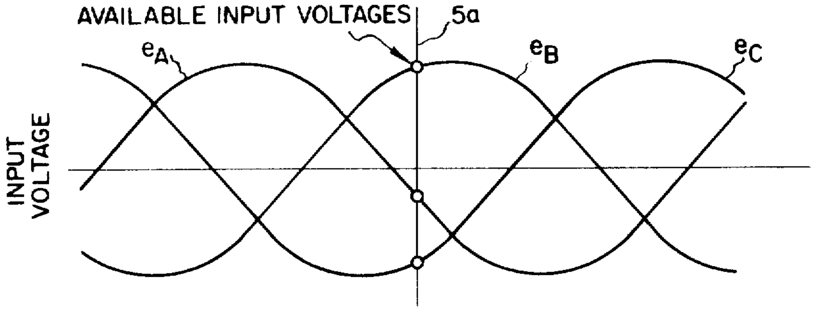
FIGS. 4*a*, 4*b*, and 4*c* are polyphase waveform diagrams showing respectively the input voltage, a desired output voltage with a frequency lower than the input, and a desired lower frequency output voltage with voltage conversion obtained other than by operation of the high frequency coupling transformer.
Figure 4B:
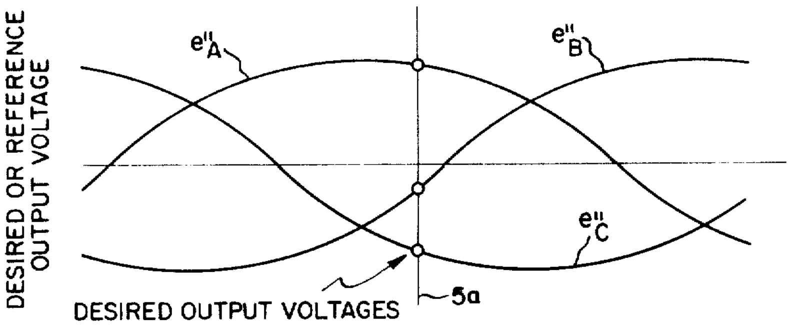
Figure 4C:
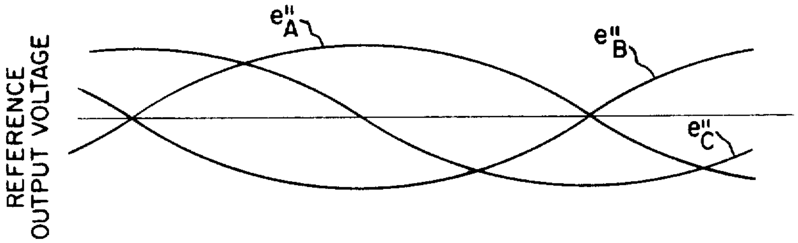

The waveform diagrams in FIGS. 4a–4c, FIG. 5a, and FIG. 5b are useful in explaining the principles of the control method and the effect upon the power converter of the operation of control computer 45. FIG. 4a shows the polyphase input voltage waveforms $e_A$, $e_B$, and $e_C$. In FIG. 4b, the desired or reference output voltage waveforms $e''_A$, $e''_B$, and $e''_C$ have a lower frequency than the input, and are drawn with the same peak voltage values as is obtained by the use of a coupling transformer 21 with a unity turns ratio or the use of coupling capacitor 42. There is both frequency conversion and regulation, since the actual output voltages approximate the references regardless as to the variations in the input frequencies. The reference output voltage waveforms in FIG. 4c demonstrate both frequency and voltage conversion and regulation. Voltage conversion is obtained by changing the turns ratio of coupling transformer 21, or by changing the reference output voltages, or by combining both mechanisms. The voltage waveforms in FIGS. 4b and 4c are sine waves, as is the input voltage in FIG. 4a, but this is not essential since the reference output voltage waveforms need not have the same waveshape as the input. Further, the reference waveforms can be changed to provide actual output voltages that are adjustable as to frequency or voltage magnitude or both.

Figure 5A:
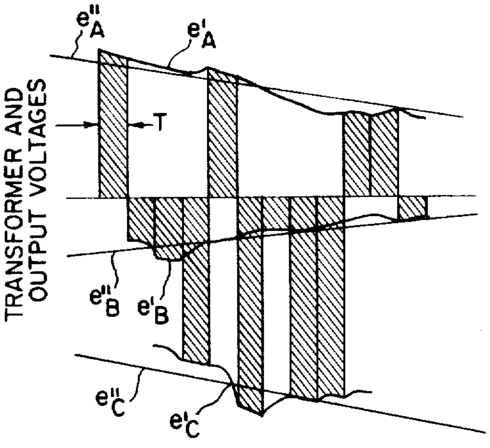
FIGS. 5*a* and 5*b* are respectively transformer voltage and current waveform diagrams illustrating the random time sharing of the high frequency link by the input and output phases.
Figure 5B:
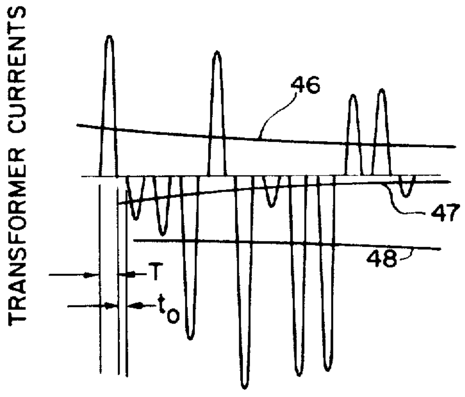

FIG. 5a illustrates to an enlarged scale the voltages appearing in high frequency coupling transformer 21 when the reference output voltages have approximately the values shown at line 5a–5a in FIG. 4b. On this scale, the reference output voltages $e''_A$, etc., appear as inclined straight lines, while at a still higher switching frequency these voltages appear to the switches as essentially direct current voltages. At the same instantaneous time the available input voltages are shown along the same line in FIG. 4a. The voltage segments or pulses each with a period T are distributed to the output phases in random sequence as the result of the process of selecting the one thyristor combination that minimizes the net effective error between the predicted and reference output voltages. The voltage pulses ordinarily have a magnitude somewhat greater or less than the reference voltage magnitude since the error is seldom exactly zero. The actual output voltage waveforms $e'_A$, $e'_B$, and $e'_C$ have a high frequency ripple due to the fact that the output filter capacitors $C_o$ are supplying current to the load in each phase during the time that the switch in that phase is open. When the frequency of the high frequency link is very much greater than that of the supply voltage or that of the reference voltage, for example, 10 kHz as opposed to 60 Hz or less, it is seen that the errors tend to cancel and that the actual output voltages substantially approximate the reference voltages. In FIG. 5b, the transformer currents are half sinusoidal pulses of current with the corresponding random distribution among the output phases. To maximize the efficiency of the power converter circuit, the resonant frequency of the series capacitor commutating circuit is chosen such that the half sine wave of current completely fills up the switching period T with the exception of the turn-off time $t_o$, to allow time for control computer circuit 45 to operate and generate firing signals for the next selected combination of thyristors to be fired, and to prevent commutation failures. The turn-off period $t_o$ is preferably made independent of possible variations in conduction time of the thyristors by a lockout scheme such as that shown in FIG. 7 or in FIG. 5 of application Ser. No. 10,804. The lockout circuit uses thyristor current detectors or voltage state detectors to produce signals that prevent further thyristor firing until the present current pulse has been completed, plus the fixed delay for turn-off time. The average output current in each phase is shown by curves 46–48.

The details of an illustratory control computer circuit 45 for the FIGS. 1 and 2 polyphase power converters based on a voltage regulating system are shown in FIGS. 6–11. A similar technique can be used for a current regulating system since the reference output waveforms in FIG. 4*b* can be either voltage or current waveforms. Control computer 45 can be either an analog or digital computer or a combination of the two, and is preferably constructed of special circuitry fabricated in integrated circuit form. It is within the scope of the invention, however, to have the power circuit controlled by a properly programmed general purpose computer. The power converter must be provided with the necessary state-sensing devices to provide the required input data for control computer 45 to process the signals and make the thyristor selection. For the system being described, transducers are needed for all input voltages, all output voltages, all commutating capacitor voltages, and all output currents. In addition, reference signals are required for the quantities being regulated, in this case the output voltages. Suitable state-sensing devices are transducers such as instrument transformers, Hall effect devices, voltage dropping resistors, etc. In FIG. 1, potential transformer primary windings 50*p*–52*p* sense the input voltages $e_A$, $e_B$, and $e_C$. The commutating capacitor voltages with an equivalent value $E_c$ are sensed by transformer windings 53*p*, only one of which is shown here. The actual output voltages $e'_A$, $e'_B$, and $e'_C$ are sensed by transformer windings 54*p*–56*p* connected across the respective output filter capacitors 38–40, while the output currents $i'_A$, $i'_B$, and $i'_C$ are measured by windings 57*p*–59*p*. The correspondingly numbered transformer secondary windings 50*s*–59*s* are the inputs to control circuit 45. These input quantities are indicated specifically on the equivalent circuit of FIG. 2. The remaining input data are the desired or reference output voltages $e''_A$, $e''_B$, and $e''_C$.

The development of the predicted output voltages at each phase after transfer of an energy transfer pulse is as follows. These equations are reasonable approximations. Suppose that thyristors A1, A2, and B'1, B'2 were to be fired simultaneously. The change $E_c\Delta$ in the commutating capacitor voltage that would occur during the pulse is given approximately by the following equation in which Q is the quality factor of the series resonant circuit:

$$E_c\Delta = (e_A - e'_B - E_c)\,[1 + exp(-\pi/2Q)] \qquad (2)$$

Changes in $e_A$ and $e'_B$ during the pulse are neglected, which is valid when the pulse period T is very much shorter than the periods of the input and output frequencies and the filter capacitors $C_i$ and $C_o$ are much larger than $C_c$. The average current from input phase A to output phase B' during the interval T is $C_cE_c\Delta/T$ amps. The predicted output voltages of each phase at the end of the energy transfer pulse are:

$$\text{phase A'}: e'_A - i'_A \cdot T/C_o \qquad (3)$$

$$\text{phase B'}: e'_B - i'_B \cdot T/C_o + E_c\Delta \cdot C_c/C_o \qquad (4)$$

$$\text{phase C'}: e'_C - i'_C \cdot T/C_o \qquad (5)$$

In the above equations, the term with the output current in each equation represents the change of voltage of the respective filter capacitor $C_o$ due to discharge of current during the interval T. Assuming that a least-square criterion is used to obtain the minimum net effective error, the sum of the predicted output voltage errors squared is $$[e''_A - (e'_A - i'_A \cdot T/C_o)]z\,[e''_B - (e'_B - i'_B \cdot T/C_o + E_{c\Delta} \cdot C_c/C_o]^2 + [e''_C + (e'_C - i'_C \cdot T/C_o)] \quad (6)$$

The foregoing equation gives the net effective error obtained by thyristor firing combination No. 2 in FIG. 3. This sum is compared with the other eight sums corresponding to the alternative thyristor firing combinations, and the sum obtained when a pulse is omitted entirely, corresponding to equation (6) with the term $E_{c\Delta} \cdot C_c/C_o$ deleted. The combination giving the minimum errors-squared value is selected and gate pulses for the appropriate thyristors are generated.

The accuracy of these equations can be improved to permit operation with a low ratio of the high frequency link to the input and output frequencies. Instead of assuming $e_A$ and $e'_B$ to be constant, knowledge of the slope of the voltage change permits the processing of the voltage transducer signals through lead networks to predict the average voltage expected during the pulse interval. The desired lead time is T/2. In similar fashion the output current transducer signals can be passed through a network giving a lead of T/2 so that the average current during the time interval T is estimated. For some systems, a less accurate calculation of the least-square errors may be adequate, such as by assuming that the change in output filter capacitor voltage is negligible thereby eliminating the terms of equation (6) with the output currents.

Figure 6:
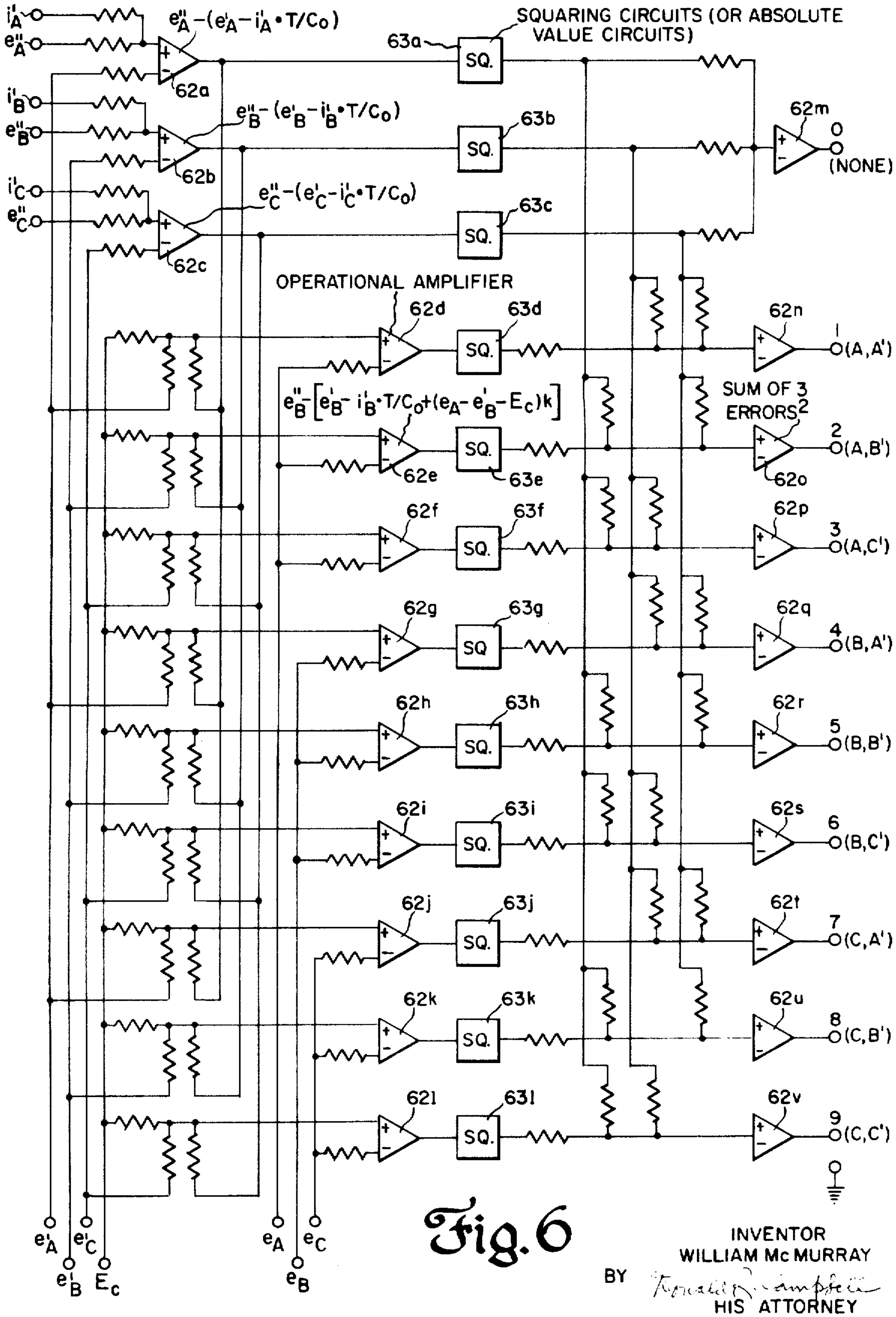
FIG. 6 is a schematic block diagram of the portion of the firing selection computation circuit for deriving the predicted net effective error for each of the ten thyristor combination firing options.

The analog computer of FIG. 6 predicts the net effective errors that result from each of the ten thyristor firing options identified at the output terminals as combination Nos. 0–9. This circuit employs integrated circuit components, specifically operational amplifiers 62*a*–62*v* for the summing operations and squaring elements 63*a*–63*l*. A number of suitable operational amplifiers are available commercially, and these are connected in known manner with a resistor between the output and the inverting (−) input terminals. Squaring elements 63*a*–63*l* are more particularly analog multipliers with common *x* and *y* inputs. The Motorola MC-1595L integrated circuit is appropriate, and there are a number of commercially packaged hybrid multipliers which can also be used. The various summing resistors are selected for the appropriate constants of proportionality.

The operation of the FIG. 6 analog computer is evident to those skilled in the art. The summing operational amplifier 62*a*, for example, has the signal $e'_A$ applied through a resistor to the inverting input, while the signals $i'_A$ and $e''_A$ are applied through parallel resistors to the non-inverting input. The output is the sum $e''_A - (e'_A - i'_A \cdot T/C_o)$. This sum is squared by squaring element 63*a*. The components required to make calculations according to the above equation (60 for the predicted output voltage errors-squared for thyristor firing combination No. 2 (A, B') are operational amplifiers 62*a*–62*c*, 62*e*, and 62*o*, and the associated squaring elements. As an aid to understanding, the sum computed by each of the first four operational amplifiers is given about the component, and the final operational amplifier 62*o* computes the sum of the three errors squared which is supplied to output terminal No. 2. At the other output terminals are voltage levels representative of the predicted net effective errors obtained by the other nine thyristor firing combinations.

Figure 7:
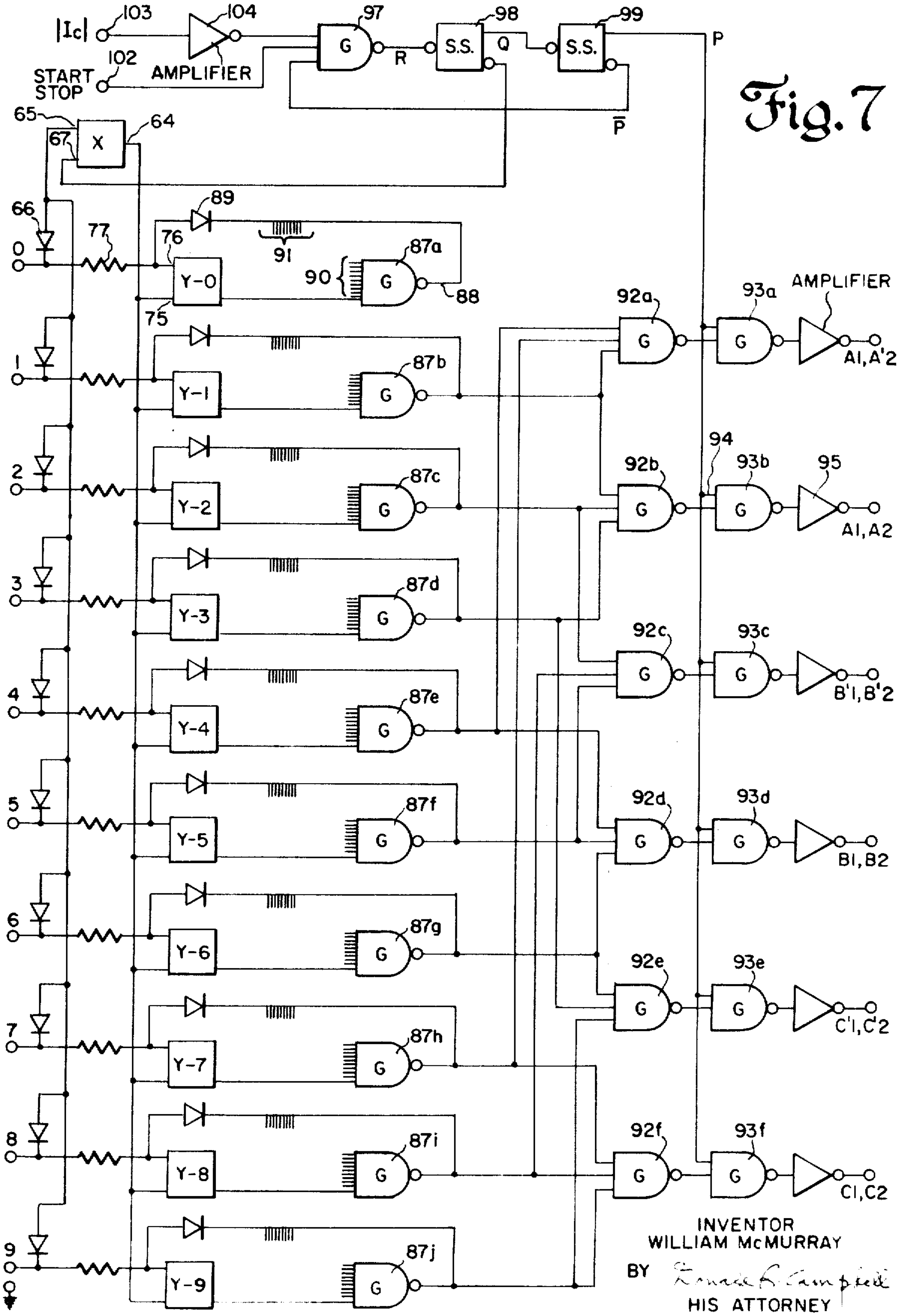
FIG. 7 is a schematic block diagram of the remainder of the firing selection computation circuitry including the minimum error selector and the thyristor firing logic.

The analog-digital circuit given in FIG. 7 includes a minimum error selector and the thyristor firing logic. The ten predicted net effective error voltages from FIG. 6 are applied to input terminal Nos. 0–9, and the circuit selects the minimum error voltage and activates the firing logic for supplying gating signals to the thyristors associated with the combination having the minimum net effective error. Circuit element X is a specially designated circuit that is blocking to all the net effective error voltages with the exception of the minimum voltage which is reproduced at its output terminal 64. Data input terminal 65 is connected through separate blocking diodes 66 to each of input terminals Nos. 9–9. All of diodes 66 are reverse biased with the exception of the one diode connected to the input terminal with the minimum error voltage. Referring to the detailed circuit diagram of element X in FIG. 8, data input terminal 65 is coupled directly to the base of an n-p-n transistor 68, and output terminal 64 is connected directly to the emitter of this transistor. In operation, the base of transistor 68 falls to one diode drop above the minimum of the ten input error voltages. The emitter voltage of transistor 68, the output of the circuit, is then approximately equal to the minimum error voltage. To further describe circuit element X, the collector-emitter of transistor 68 is connected in series with a resistor 69 between +V and −V supply terminals. To implement the resetting and inhibit function, a base of another n-p-n transistor 70 is connected to input terminal 67, while the emitter is grounded and the collector is connected through a resistor 71 to the +V supply terminal. When transistor 70 is not conducting, voltage is supplied to the series circuit comprising a Zener diode 61 and resistor 72 connected between the collector and the −V supply terminal. Accordingly, base drive is supplied to a third n-p-n transistor 73 whose collector-emitter are connected directly between the base of transistor 68 and the −V supply terminal. A resistor 74 further couples the collector of transistor 73 to the +V supply terminal. This circuit and also the entire minimum error selector circuit is reset by turning off transistor 70, which consequently turns on transistor 73 and causes transistor 68 to turn off by removing its base drive, thereby dropping the output voltage on terminal 64.

The minimum error voltage selected by circuit element X is an input 75 (see FIG. 7) to 10 identical circuit elements Y–O to Y–9, and the other input 76 of each of these circuit elements is coupled through a resistor 77 to the respective circuit input terminals Nos. 0–9. The purpose of circuit elements Y is to indicate to the thyristor firing logic the particular thyristor firing combination with the minimum net effective error voltage. Referring to the detailed circuit diagram of circuit element Y in FIG. 9, inputs 75 and 76 are connected directly to the emitter and base of n-p-n transistor 78. The collector of transistor 78 is coupled through voltage divider resistors 79 and 80 to the +V supply terminal. Of the 10 circuit elements Y–0 to Y–9, nine transistors 78 whose bases are resistively coupled to input error voltages greater than the minimum are turned on, while only one transistor 78 remains off. Opposite type transistors 81 and 82 are level-shifting transistors that are connected with voltage dividing resistors 83 and 84 between the +V and ground supply terminals. Output terminal 85 is coupled to the collector of transistor 82. In operation, turning on transistor 78 in order supplies base drive current to transistor 81 and to transistor 82, effectively putting output terminal 85 at a low voltage level. Thus, nine of the outputs of circuit elements Y–0 to Y–9 are low, while the output of the one circuit element indicating the thyristor firing combination with the minimum net effective error is high.

The minimum error selector is completed by ten 10-input digital gates 87$a$–87$j$ (FIG. 7). One input to each of these gages is the high or low output voltage from the respective circuit element Y–0 to Y–9, only one of which is high. The output terminal 88 of each gate 87$a$–87$j$ is coupled in a feedback loop including a diode 89 to input terminal 76 of the corresponding circuit element Y. Each output terminal 88 is further connected to one of the inputs of each of the other nine gates 87$a$–87$j$. Referring to gate 87$a$, the nine additional inputs are indicated collectively at 90, and the nine additional connections of output terminal 88 to each of the other gates is indicated schematically at 91. Gates 87$a$–87$j$ are further built with AND circuit logic that requires that all 10 inputs be at a high level in order to produce a low level voltage output. The result of this arrangement is that nine of these 10 gates have at least one low input from the corresponding circuit element Y, which causes these outputs to be high. The remaining gate associated with the thyristor combination having the minimum error voltage has a high input from the corresponding circuit element Y, causing the low output to be coupled through feedback diode 89 to terminal 76 (FIG. 9), thereby locking the associated transistor 78 in the conducting condition and latching the entire circuit element Y in the high output state condition. Therefore, the corresponding 10-input gate is also latched and the nine other gates are held inactive due to the connection of that output terminal to the input terminal of the other nine. Accordingly, the minimum error selector is latched into a state with only one gate output low, despite subsequent changes in the input signals to the analog computer of FIG. 6.

The thyristor firing logic is implemented with six 3-input gates 92$a$–92$f$ and six 2-input gates 93$a$–93$f$, all containing AND circuit logic. All of the gate circuits of FIG. 7 are preferably fabricated in integrated circuit form, and a number of commercially available components are appropriate. Circuit elements X and Y are also preferably integrated circuits. With the thyristor firing logic connected as illustrated, the operation is best explained by assuming that thyristor firing combination No. 2 has the minimum net effective error. The output of gate 87$c$ is low, so that at least one input to gates 92$b$ and 92$c$ is also low. All of the other inputs to gates 92$a$–92$f$ are high. Thus, only gates 92$b$ and 92$c$ produce output signals that are gated by gates 93$b$ and 93$c$ when the signal at the other input terminals 94 indicates the start of the gate pulse period. Drive amplifiers 95 independently amplify the outputs of gates 93$b$ and 93$c$ and produce gating signals for thyristors A1, A2 and B'1, B'2.

The operating sequence of the control computer 45, FIGS. 6 and 7, is coordinated by the circuitry shown at the top of FIG. 7. The main components are a 3-input gate 97 which actuates sequentially a first single-shot multivibrator 98 and a second single-shot multivibrator 99. Single-shot multivibrator 99 is the gate pulse timer. During the on-tine of circuit 99, an output signal P is produced that is connected to the previously mentioned input terminals 94 of gates 93$a$–93$f$. During the off-time, the output signal $\overline{P}$ from circuit 99 is connected back as an input to gate 97. A second input to gate 97 is a start-stop signal applied to input terminal 102 to indicate that the power circuit is being energized A third input to gate 97 is the inverse of capacitor current presence logic signal $|I_c|$ applied to input terminal 103 and inverted by amplifier 104 whenever current is flowing in a commutating capacitor in the power circuit or in the combined coupling and commutating capacitor $C_c$ in FIG. 2. The signal $|I_c|$ can be obtained as suggested in FIG. 10 by the use of a current transformer 105 for sensing the presence of capacitor current $i_c$, followed by a clipping amplifier 106 and an absolute value computing element 107. Component 107 can be, for example, the absolute value computing element comprising an operational amplifier and a matched diode pair described in Electronic Design, Feb. 1, 1968, p. 134. Single-shot multivibrator 98 is the turn-off period $t_o$ timer. During the on-time of circuit 98, an output signal is connected to input terminal 67 of circuit element X for the purpose of resetting the minimum error selector.

Figure 11:
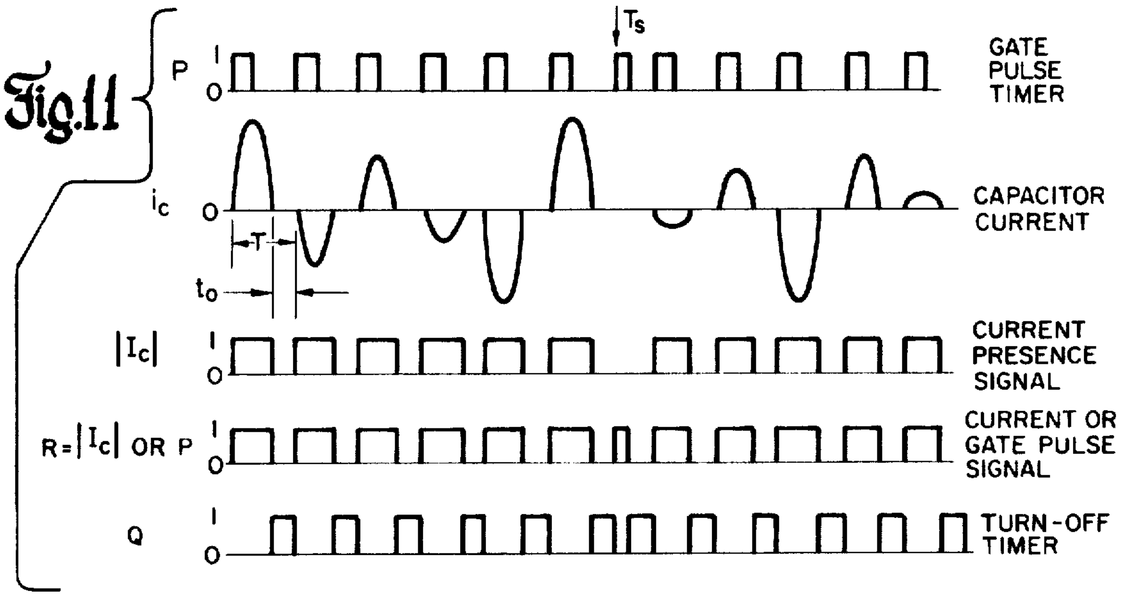
FIG. 11 is a series of waveform diagrams of various signals useful in explaining the operation of FIG. 7.

The explanation of the operation of the coordinating circuit at the top of FIG. 7 for control computer 45 is facilitated by the series of waveform diagrams in FIG. 11. Each signal with the exception of the capacitor current $i_c$ is considered to have a "1" or "0" value. The signal Q represents the output of single-shot multivibrator 98, while R represents the output signal of gate 97. The operation of control computer 45 will be reviewed briefly at the same time. Assuming that the start-stop logic signal is high and the gate pulses have ceased ($\overline{P}$ is high), the output signal R of gate 97 shifts from its high to its low value when the energy transfer pulse current ceases ( $|I_c|$ and $i_c = 0$). This activates single-shot multivibrator 98 which produces the turn-off time delay $t_o$ and resets the minimum error selector circuit. The selector circuit is reset by turning off transistor 70 in circuit element X (FIG. 8), consequently turning on transistor 73 and turning off transistor 68, thereby dropping the voltage at output terminal 64 of circuit element X and at all 10 input terminals 75 of the 10 circuit elements Y–0 to Y–9. All transistors 78, 81, and 82 in circuit elements Y–0 to Y–9 now turn on and all of the 10-input gates 87$a$–87$j$ have one low input each and, therefore, all high outputs. The thyristor firing logic, however, as may be recalled, is activated only when one of these 10-input gates has a low output.

Figure 8:
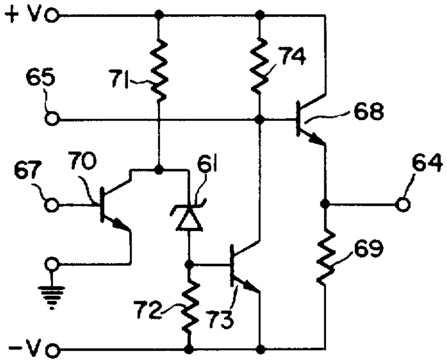
FIGS. 8 and 9 are detailed circuit diagrams of the circuit elements shown in block form in FIG. 7 for determining the minimum error voltage and for using this minimum error voltage to indicate the corresponding firing combination.
Figure 9:
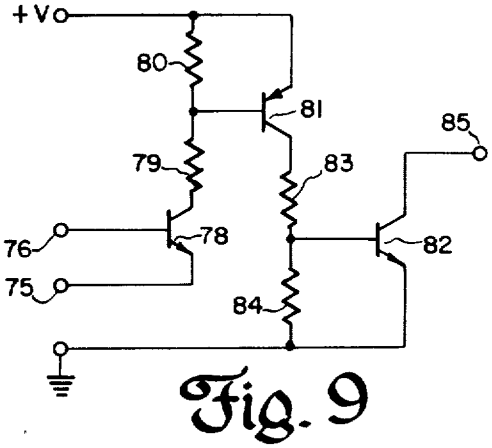
Figure 10:
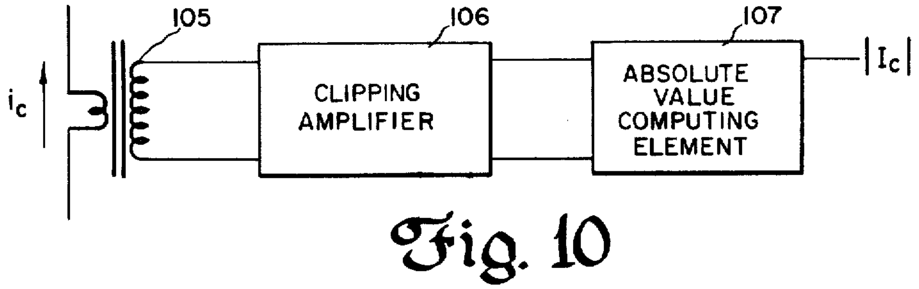
FIG. 10 is a schematic block diagram of a circuit for deriving the commutating capacitor current presence signal $|I_c|$ shown as an input at the top of FIG. 7.

Upon completion of the turn-off period $t_o$, output signal Q of single-shot multivibrator 98 shifts from the high to the low value, thereby removing the reset or inhibit signal applied to input terminal 67 of circuit element X and releasing the minimum error selector to make a selection according to the state of the predicted net effective error computer (FIG. 6) at that instant. As was previously explained in detail, the FIG. 6 error computer is composed of analog computer components that calculate the predicted net effective errors based on the least-squares criterion for the 10 possible thyristor firing combinations. Using the input signals shown at the top left and bottom left of the Figure, the generated analog voltages at output terminal Nos. 0–9 represent the computed errors for the 10 combinations. The minimum error selector circuit at the left of FIG. 7 includes 10 blocking diodes 66 effectively connected in parallel with input terminal 65 of circuit element X (FIG. 8). Only the diode associated with the minimum net effective error voltage is conductive, and the diode drop through diode 66 is restored by the base-emitter of transistor 68 so that the minimum error voltage appears at output terminal 64. This voltage is applied to the emitters of all 10 transistors 78 in circuit elements Y–0 to Y–9 (also see FIG. 9). The nine transistors 78 whose bases are resistively coupled to inputs greater than minimum are turned on, thereby turning on the level-shifting transistors 81 and 82, which apply a low input voltage to one input of the following 10-input logic gates 87*a*–87*a8*. However, the transistor 78 whose base is coupled to the minimum input voltage has no base drive and turns off, thereby also turning off transistors 81 and 82 and applying a high voltage input to one of the 10-input logic gates. The output of that 10-input gate becomes low, and by means of the feedback path including diode 89, latches the transistor 78 in the corresponding circuit element Y in the non-conducting condition. The low output of the one 10-input gate corresponding to the minimum error voltage is also connected to an input terminal of the nine other gates, as indicated at 90, 91, holding them inactive. Thus, the minimum error selector is latched into a state with only one 10-input gate output low, despite subsequent changes in the input signals to the predicted net effective error computer.

Two of the six following 3-input gates 92*a*–92*f* have low input voltage signals and these two 3-input gates produce high outputs which direct the appropriate gate pulse amplifiers 95 to fire the selective thyristors when logic signal P is applied to the 2-input gates 93*a*–93*f*. When single-shot multivibrator 98 completes the timing of the turn-off period $t_o$ and releases the minimum error selector to make its selection, output signal Q also activates the second single-shot multivibrator 99. Output signal P is produced during the on-time of multivibrator 99, which times the application of the gate pulses to the selected thyristors. This is typically about 10 microseconds.

The pattern of control logic signals coordinating the operation of control computer 45 is repetitive with a period T corresponding to the period of the energy transfer pulses as shown at the left half of FIG. 11. The event starting at time $T_x$ is different from the rest of the sequence. Here it is assumed that a power pulse does not occur, either because the minimum error selector elects not to fire any thyristors (combination No. 0) or because the thyristor driving voltage does not exceed the critical firing value. The duration of signal R is shorter than normal and is now equal to that of gate timing pulse P. Even though no thyristors have fired, a turn-off delay $t_o$ following the end of signal P is allowed before another firing selection is attempted. It is assumed that conditions have changed during the interval, so that the normal sequence of power pulses resumes at this time.

The operation of control computer 45 for reverse power flow in the direction from the load to the source is similar. The condition that power is being fed back to the source is determined by reverse direction flow of output currents $i'_A$, etc. In general it is necessary to change the reference output waveform $e''_A$, etc., supplied to the control computer. The desired operation of the power converter circuit for reverse power flow depends upon the nature of the load and the purpose for feeding power back to the supply.

It is desirable that control computer 45 include additional logic to eliminate certain thyristor firing combinations from consideration under particular operating conditions or to simplify the control computer, despite the fact that the combination might satisfy the minimum error criterion. For instance, firing the thyristors in inverse-parallel relationship with those that were conductive during the last previous pulse returns the power circuit to the same state as before the last pulse, an unlikely requirement unless the load has suddenly changed. Also, current limiting is needed to prevent damage to the components, such as is incorporated in the single phase power converters described in U.S. Pat. No. 3,487,289. For power circuits using a coupling transformer 21, any conditions which cause saturation of the transformer should be eliminated, although it is appreciated that the transformer is designed so that the desirable minimum error combination is normally allowable. Another desirable feature is to incorporate protective logic circuitry to promote recovery of the power circuit from commutation failures that occur as a result of noise-induced misfiring, *dv/dt*, or breakover firing of the thyristors.

Figure 12:
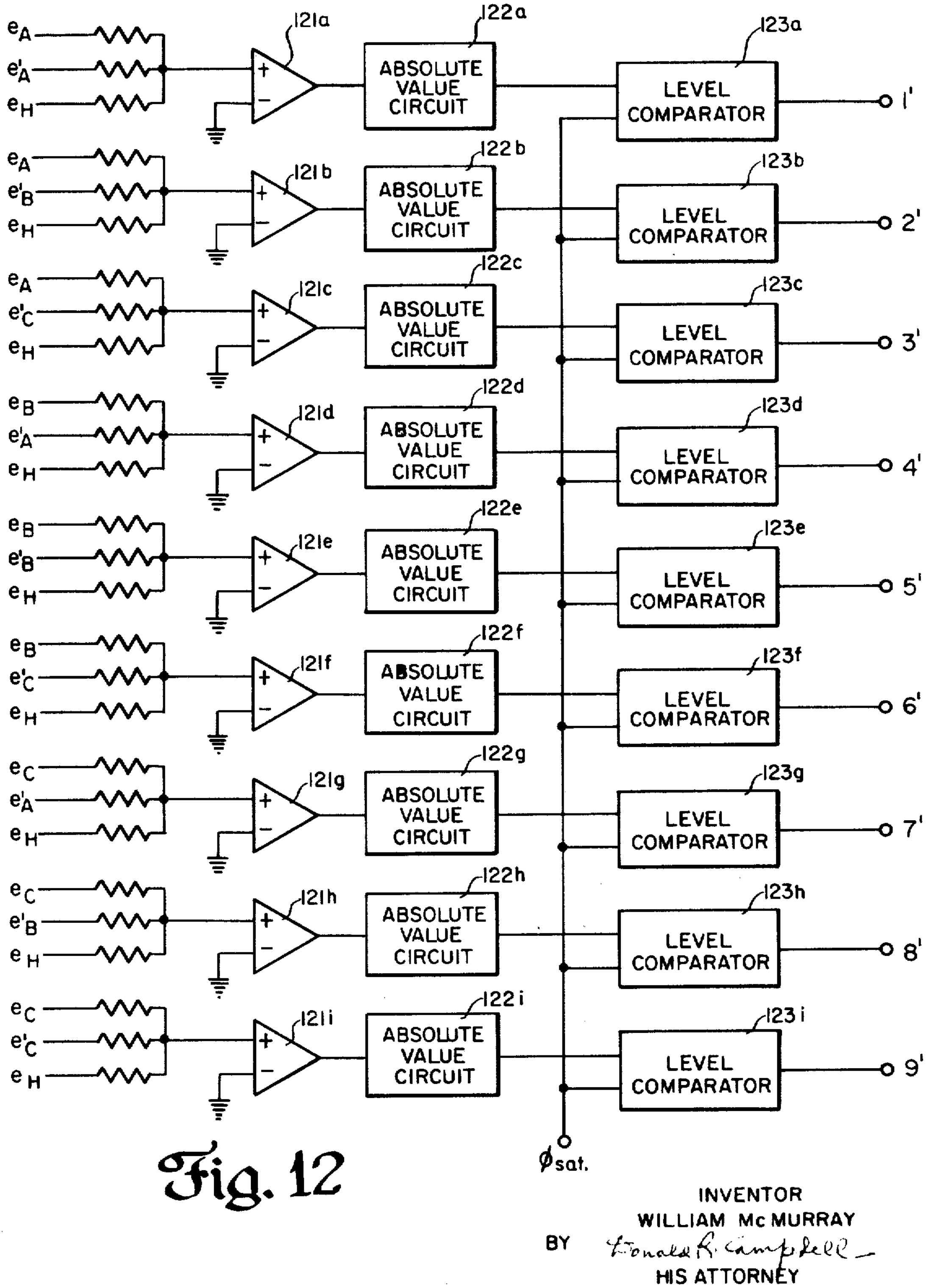
FIG. 12 is a block diagram of a transformer flux limit circuit for preventing saturation of the high frequency coupling transformer.

One form of suitable logic to prevent saturation of high frequency coupling transformer 21 (FIG. 1) is shown in FIG. 12. In order to predict the transformer flux obtained at the end of the next energy transfer pulse by the different combinations of thyristors, additional input data indicative of the instantaneous transformer flux is required. This can be obtained using the Hall probe sensor 120 illustrated schematically in FIG. 1. The Hall voltage $e_H$ is proportional to the transformer flux $\phi_H$. The predicted flux $\phi$ for any given combination is the sum of the sensed transformer flux and the predicted change in flux due to the input voltage and due to the output voltage. For combination No. 2 the equation is $$\phi = \phi_H + ke_A + k'e_B', \tag{7}$$

where the constants $k$ and $k'$ depend on such factors as the equivalent primary and secondary side capacitances, the turns ratio, and the period T.

The analog logic circuit shown in FIG. 12 generates a signal at output terminals 1'–9' whenever the predicted flux for any thyristor combination exceeds a selected saturation reference flux $\phi_{sat}$. Calculations based on equation (7) are made for each combination using operational amplifiers 121*a*–121*i*. The absolute values of the sums so produced are obtained in absolute value circuits 122*a*–122*i* and are compared with the reference $\phi_{sat}$ in level comparator circuits 123*a*–123*i*. The level comparators produce an output signal $\phi_{lim}$ at their respective output terminals 1'–9' only when the predicted flux is greater than the reference. For combination No. 2, for example, the input voltages $e_H$, $e_A$, and $e'_B$ are applied through three parallel summing resistors to the non-inverting input of operational amplifier 121*b*. The absolute value of the sum is compared with $\phi_{sat}$ in level comparator 123*b*, which can also be a suitable summing circuit, and a voltage is applied to terminal 2' only when the transformer would saturate at the end of the next energy transfer pulse if this combination were fired.

Figure 13:
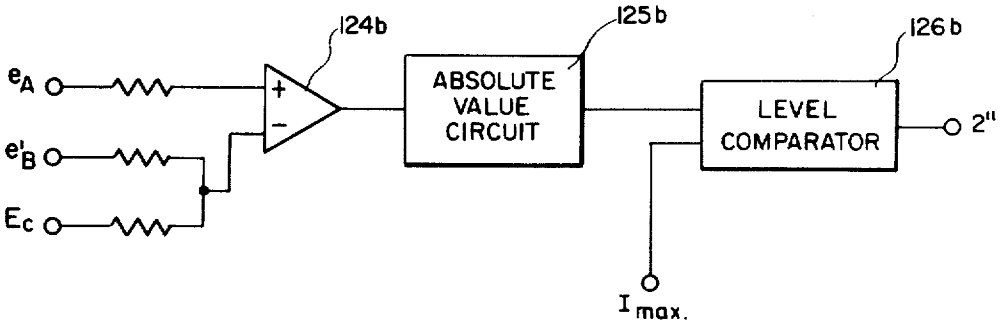
FIG. 13 is a block diagram for only one thyristor combination of a current limit circuit.

Logic to implement current limiting is similar. Referring to FIG. 13, the predicted peak current in the high frequency link for each thyristor combination can be obtained using the change in the commutating capacitor voltage $E_c$ that would occur during the next energy transfer pulse. This is given by equation (2) and depends on the sensed capacitor voltage $E_c$ and the input and output voltages for each combination. The predicted peak current more particularly is $$I = ½ E_c \sqrt{C_{eff}/L_{eff}} \tag{8}$$

The circuitry for combination No. 2 only is given in FIG. 13 and includes an operational amplifier 124*b* with summing resistors connected to inputs $e_A$, $e'_B$, and $E_c$, absolute value circuit 125*b*, and level comparator 126*b*. The absolute value of the predicted peak current is compared with a preselected maximum allowable current $I_{max}$ in the level comparator, which generates an output voltage signal $I_{lim}$ at terminal 2'' when the maximum current is exceeded.

Figure 14:
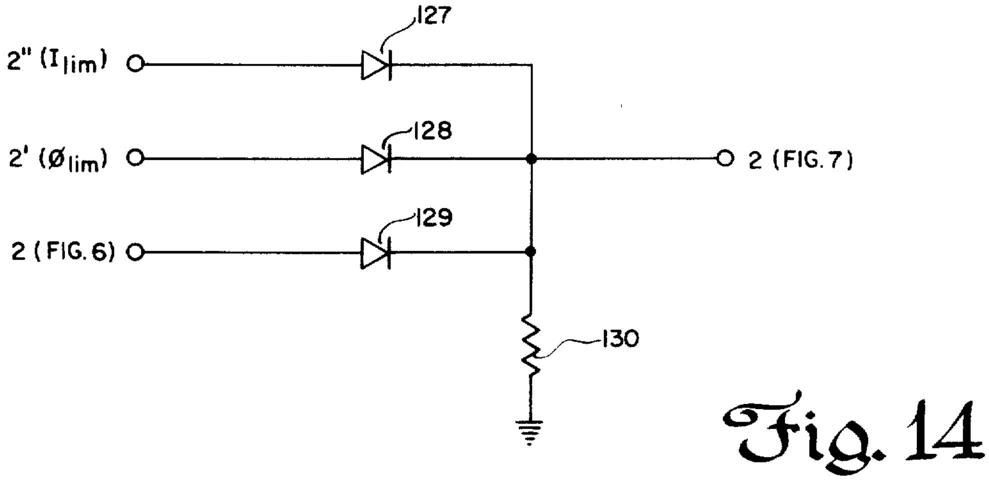
FIG. 14 is a schematic circuit diagram of override logic for preventing the minimum error selector of FIG. 7 from selecting a thyristor combination that would cause transformer saturation or the current limit to be exceeded.

The override logic illustrated in FIG. 14 is operative to prevent the minimum error selector circuit (left hand of FIG. 7) from selecting any thyristor combination that would if fired next cause the coupling transformer to saturate or the circuit current to rise above the limit current. Only the OR circuitry for combination No. 2 is shown, although there is of course similar circuitry for each of the nine combinations. Three parallel diodes 127–129 are connected to input terminal No. 2 of the FIG. 7 selector circuit. One input is from output terminal No. 2 of the FIG. 6 computation circuit which generates an analog voltage indicative of the predicted error voltage for this combination. A second input is the $\phi_{lim}$ signal from terminal 2' in FIG. 12, and the third input is the $I_{lim}$ signal from terminal 2'' in FIG. 13. The appearance of a voltage at the anode of diodes 127 or 128, signifying that the limit will be exceeded, forward biases the respective diode and applies the voltage drop across resistor 130 to the FIG. 7 input terminal 2. This voltage drop is made high so that combination No. 2 is not selected by the selector circuit thus overriding selection of this combination even if it does produce the minimum error voltage. If all nine combinations cause the transformer flux or current limits to be exceeded, then the selector selects combination No. 0 and no thyristors are fired.

The control computer circuit 45 shown in FIGS. 6 and 7 based on the least-squares minimum error criterion is easily modified to calculate the predetermined net effective error voltages based upon the absolute error criterion. This is accomplished by substituting an absolute value computing element for the squaring elements 63*a*–63*l*. The absolute value computing element can be identical to component 107 shown in FIG. 10.

Figure 15:
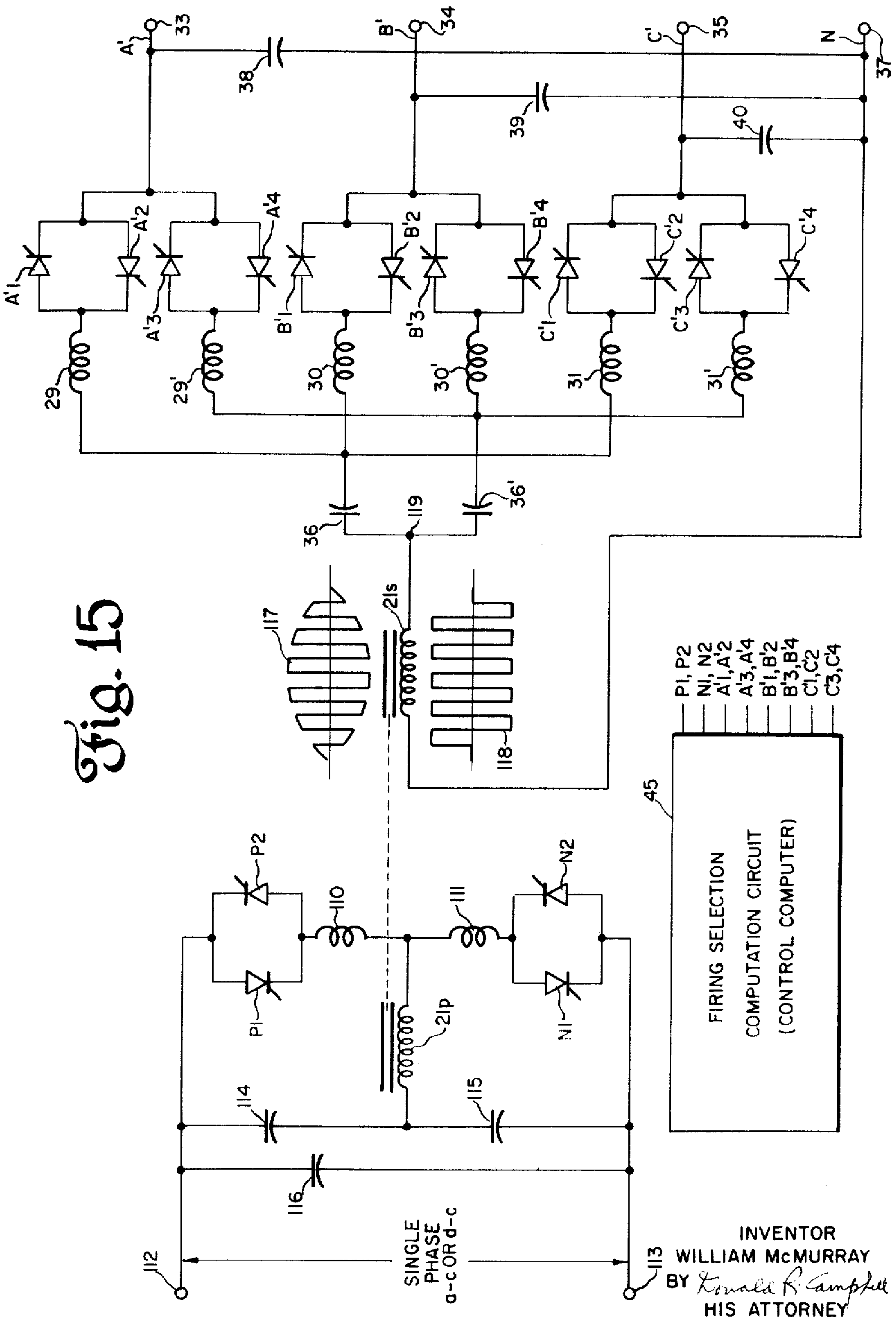
FIG. 15 is a detailed circuit diagram of another embodiment of the invention with a single phase AC or DC input circuit and a polyphase output circuit with dual energy pulse paths in each output phase.

Another embodiment of the invention in FIG. 15 illustrates some of the options that are available as to the choice of input and output switching circuit configurations, and as to multiple output paths as opposed to the single output path in FIGS. 1 and 2. This power converter has a high frequency transformer link and converts a single phase AC of a DC input to a three phase AC output voltage. This power circuit therefore achieves frequency, voltage, and phase conversion and regulation. The advantage of using two series capacitor output paths is that this gives more thyristor firing combinations to choose from, and with an appropriate circuit configuration the chance of obtaining a path giving low net effective error is improved.

The input switching circuit in FIG. 15 is in the form of a half bridge series capacitor commutated inverter using inverse-parallel pairs of thyristors P1, P2 and N1, N2. The complementary pairs of devices are connected in series with commutating inductors 110 and 111 between a pair of power supply terminals 112 and 113 that are connected across a low frequency single phase AC voltage source or a DC source The primary winding 21*p* of the high frequency coupling transformer is connected at either end to the junction of commutating inductors 110 and 111 and to the junction of a pair of commutating capacitors 114 and 115. Only a single input filter capacitor 116 is required. The operation of this half bridge inverter is well known and is described for instance with regard to FIG. 13 of U.S. Pat. No. 3,487,289. Briefly, the pairs of thyristors P1, P2 and N1, N2 are rendered conductive alternately at a switching rate that is high compared to the frequency of the source voltage and generate half sinusoidal current pulses of opposite polarity. The inverter action converts the low frequency AC supply voltage to a high frequency wave 117, or converts the DC source to a high frequency waveform such as is shown at 118.

The dual path output switching circuit includes, as one path, an output circuit identical to the FIG. 1 output circuit whose components are identified by the same reference numerals. The alternative path is provided by a second set of inverse-parallel thyristors, commutating inductors, and a commutating capacitor in the same circuit arrangement connected between transformer terminal 119 and output terminals 33–35. Corresponding components in parallel are designated by primed numerals. Looking for instance at phase A', there are two paths between transformer 21 and output terminal 33, through thyristor pair A'1, A'2 or through thyristor pair A'3, A'4. Alternatively, all four devices A'1-A'4 can be supplied with gating signals simultaneously, thereby establishing two simultaneous paths for the energy transfer pulse. Series-connected capacitor 36 and inductor 29 are in parallel with capacitor 36' and inductor 29', and assuming equal values of the commutation components, the frequency of the simultaneously conducting paths is different from that obtained when only one path is energized. The magnitude of the current pulse also changes. Accordingly, there are two thyristor firing possibilities on the input side, and nine (instead of three) firing combination on the output side.

The firing selection computation circuit 45 controls the FIG. 15 power converter by the minimum net effective error control technique to produce a desired three-phase output frequency and voltage (or current). The frequency of each output phase can be different from the frequency of the single phase AC source, if used, and the output phase, frequency, and voltage are regulated. The detailed operation of the circuit is believed to be evident from the previous description. The dual-path output side circuit makes possible another set of thyristor firing options in which energy is transferred from one output phase to another output phase without passing through coupling transformer 21. This additional mode of operation is best explained with the aid of an example. The arrangement of FIG. 15 is believed to be relevant for future train propulsion systems. Wayside distribution and collection of single phase 60 Hz or 50 Hz power at high voltage (25–50 KV) appears desirable. Low adjustable voltage, adjustable frequency three-phase power is needed to operate an induction motor such as a linear type. The high frequency link power converter is desirable to reduce the size of the transformer. A DC filter to store energy during the low voltage intervals of the source would also be very large. However, the motor can store energy in its field, and the stored energy or reactive power is particularly large in the case of linear motors. The dual-path output switching circuit allows reactive energy to be transferred as desired from one output phase to another without passing through the transformer. The single-phase input circuit operates at close to unity power factor.

In a hypothetical sequence of events, suppose that input terminal 112 is instantaneously positive with respect to terminal 113, and there is a net deficiency of energy on the output side with respect to the energy desired for this mode of operation. This deficiency is manifested by a low positive voltage on phase A'. Firing selection computer 45 renders conductive thyristors P1 and A'1 or A'3, or both of these thyristors. The resulting energy transfer pulse makes up the energy deficit in phase A'. Assume now that there is over-compensation such that a net excess of energy is now stored in the load and output filter capacitors 38–40, with considerable excess in phase A' but a deficit in phase C'. No more power is required from the source but a transfer from phase A' to phase C' is needed. Assuming that phase C' voltage is instantaneously positive at this time, the desired transfer is achieved by firing thyristors A'2 and C'3, or A'4 and C'1, with the amount of energy transferred in each case depending upon the initial charges on capacitors 36 and 36'. The A' thyristors in combination with inductor 29 or 29' form the major part of the input switching circuit, capacitors 36 and 36' in series are combined commutating and coupling capacitors, and the C' devices with inductors 31 and 31' form the major part of the output switching circuit. Accordingly, error equations can be written and these output side firing combinations can be included in the computing circuitry of control computer 45, as previously described.

Without an input side and a coupling transformer winding (point 119 is left floating) the resulting circuit that permits exchange of power between output phases can be used as a variable reactive load. This circuit simulates the action of true three-phase reactance by pumping power from one phase to another, with very little actual energy storage and, therefore, small size. A potential application is for statically controlled power factor correction on power systems. In addition the real power load of a system can be balanced.

The invention can be constructed in numerous other circuit configurations, since the various output switching circuit arrangements can be combined with different input switching circuit arrangements in all converters of the family. The polyphase dual-path output circuit in FIG. 15 can be combined with a similar polyphase dual-path input circuit configuration, or with a single-path polyphase input circuit such as is shown in FIG. 1. Similarly, the FIG. 1 power converter can be modified for single phase or DC output by using an output circuit in the same form as the input circuit of FIG. 15. Further by way of example, the single phase-to-single phase power converters shown in U.S. Pat. No. 3,487,289 can be controlled to produce an AC output with a different low frequency or to produce a DC output. To have a reasonably efficient circuit it may be necessary to establish limits on the ratios of the input and output frequencies.

In summary, a versatile power converter circuit with a high frequency single phase transformer or capacitor link between input and output switching circuits is computer-controlled to provide adjustable frequency, phase, and voltage conversion and regulation depending on the circuit configuration and desired output. Single phase AC, polyphase AC, and DC input and output switching circuit configurations can be combined as required. Selected combinations of input and output switches are fired synchronously at a high frequency switching rate to generate a series of energy transfer pulses. The control computer in advance of each energy transfer pulse operates to determine and select the combination that produces the minimum net effective error between the instantaneous predicted output waveform (either voltage or current) and a reference or desired output waveform. Regulation is inherent since the actual output waveform, with the use of proper output filtering, approximates the reference.

While the invention has been particularly shown and described with reference to several preferred embodiments thereof, it will be understood by those skilled in the art that the foregoing and other changes in form and detail may be made therein without departing from the spirit and scope of the invention.

What I claim as new and desire to secure by Letters Patent of the United States is:

1. A versatile power converter circuit for converting low frequency and unidirectional electric potentials to desired low frequency and unidirectional output waveforms comprising first and second switching circuits with a single phase high frequency link therebetween connected respectively to a set of first terminals in which appears the electric potential and to a set of second terminals at which the desired output waveform is formed, each switching circuit including a plurality of solid state switching means to establish a plurality of circuit paths through said high frequency link by simultaneous conduction of different combinations of said solid state switching means, and control means for synchronously rendering conductive a selected combination of at least one solid state switching means in each switching circuit for a predetermined interval and for sequentially rendering conductive other selected combinations at a high frequency switching rate to generate a series of energy transfer pulses, wherein said control means includes computing means operative in advance of conduction of an energy transfer pulse for determining and selecting the combination of solid state switching means that produces a minimum error, according to a predetermined criterion, between instantaneous predicted and desired output waveforms.

2. A circuit according to claim 1 wherein said computing means includes a computation circuit for implementing error equations based on the predetermined criterion and the circuit equations for the predicted output waveform using the different combinations of solid state switching means.

3. A circuit according to claim 2 wherein said computing means operates during the interval commencing at the start of the previous energy transfer pulse to select the next combination of solid state switching means to be rendered conductive.

4. A circuit according to claim 2 wherein said control means establishes a turn-off interval between consecutive energy transfer pulses, and said computing means operates during each turn-off interval to select the next combination of said solid state switching means to be rendered conductive.

5. A circuit according to claim 2 wherein said first and second switching circuits further include series capacitor commutation means comprising commutating inductor means effectively coupled in series circuit relationship with commutating capacitor means and tuned to series resonance at a frequency higher than said switching rate for developing said series of energy transfer pulses, and said computing means operates in the interval created between consecutive energy transfer pulses to select the next combination of solid state switching means to be rendered conductive.

6. A circuit according to claim 2 wherein the predetermined criterion on which the error equations are based is a least sum of errors squared criterion.

7. A circuit according to claim 2 wherein the predetermined criterion on which the error equations are based is a least sum of absolute errors criterion.

8. A circuit according to claim 1 wherein said computing means includes a computation circuit implementing approximate equations for the net effective error, according to the predetermined criterion, for each combination of simultaneously conducting solid state switching means, and a selector circuit for selecting the combination with the minimum net effective error, and a plurality of sensing devices connected in said first and second switching circuits to supply input data to said computation circuit.

9. A circuit according to claim 8 wherein said computation circuit further computes the net effective error when none of said solid state switching means conducts.

10. A circuit according to claim 8 wherein said high frequency link comprises a single phase high frequency coupling transformer, and said converter further includes a transformer flux limit circuit for overriding the selection of any combination of solid state switching means causing saturation of said coupling transformer.

11. A circuit according to claim 8 wherein said converter further includes a current limit circuit for overriding the selection of any combination of solid state switching means causing the current to exceed a preselected maximum value.

12. A circuit according to claim 1 wherein said first and second switching circuits are both polyphase circuits, and a plurality of sensing devices connected in said switching circuits to supply input data to said computing means.

13. A circuit according to claim 1 wherein one of said switching circuits is an inverter circuit and the other switching circuit is a polyphase circuit, and a plurality of sensing devices connected in said switching circuits to supply input data to said computing means.

14. A circuit according to claim 1 wherein said high frequency link comprises a single phase high frequency linear transformer, and filter capacitor means connected between said first terminals and other filter capacitor means connected between said second terminals.

15. A circuit according to claim 1 wherein said high frequency link comprises a coupling capacitor, and filter capacitor means connected between said first terminals and other filter capacitor means connected between said second terminals.

16. A versatile power converter circuit for converting low frequency and unidirectional electric potentials to desired low frequency and unidirectional output waveforms comprising
- first and second switching circuits with a single phase high frequency link therebetween connected respectively to a set of first terminals in which appears an electric potential and to a set of second terminals at which the desired output waveform is formed,
- each switching circuit including a plurality of bidirectional conducting solid state switching means to establish a plurality of circuit paths through said high frequency link between said first and second terminals by simultaneous conduction of different combinations of said solid state switching means, and
- control means including a firing circuit for synchronously rendering conductive a selected combination of at least one solid state switching means in each switching circuit for a predetermined interval and for sequentially rendering conductive other selected combinations at a high frequency switching rate to thereby generate a series of energy transfer pulses, wherein
- said control means includes a computation circuit operating repetitively in advance of conduction of each energy transfer pulse for computing the net effective error between instantaneous predicted and desired reference output waveforms for each combination of solid state switching means, and a selector circuit for selecting the combination with the minimum net effective error and supplying a signal to said firing circuit.

17. A circuit according to claim 16 wherein a single bidirectional conducting solid state switching means is effectively coupled in series circuit relationship between each terminal of said first and second switching circuits and said high frequency link.

18. A circuit according to claim 16 wherein at least one of said first and second switching circuit has a plurality of said bidirectional conducting solid state switching means effectively connected in series circuit relationship between each of its respective terminals and said high frequency link to provide additional circuit path options.

19. A circuit according to claim 16 wherein said high frequency link comprises a single phase high frequency linear transformer,
- filter capacitor means connected between said first terminals and other filter capacitor means connected between said second terminals, and
- a plurality of sensing devices connected in said switching circuits to supply input data signals to said net effective error computation circuit.

20. A circuit according to claim 16 wherein said high frequency link comprises a coupling capacitor,
- filter capacitor means connected between said first terminals and other filter capacitor means connected between said second terminals, and
- a plurality of sensing devices connected in said switching circuits to supply input data signals to said net effective error computation circuit.

21. A circuit according to claim 16 wherein said first and second switching circuits further include series capacitor commutation means comprising commutating inductor means effectively coupled in series circuit relationship with commutating capacitor means and tuned to series resonance at a frequency higher than said switching rate for developing said series of energy transfer pulses in the form of half sinusoidal current pulses separated by turn-off intervals, and
- said computation circuit and selector circuit operate in each turn-off interval to select the next combination of solid state switching means with the minimum net effective error.

22. A circuit according to claim 21 further including lockout means to inhibit operation of said minimum net effective error selector circuit and firing circuit during conduction of said half sinusoidal current pulses.

23. A circuit according to claim 22 wherein said computation circuit is arranged to compute the net effective error for each combination of solid state switching means by taking the sum of the squares of the errors between the instantaneous predicted output waveform and the desired reference output waveform.

24. A circuit according to claim 23 wherein the desired reference output waveform is a voltage waveform having a frequency different from the frequency of the electric potential appearing at said first terminals.

25. A versatile power converter circuit comprising
- first and second switching circuits with a single phase high frequency link therebetween connected respectively to a set of first terminals in which appears a low frequency electric potential and to a set of second terminals at which a low frequency output waveform is formed, wherein at least one of said switching circuits is a three-phase circuit,
- each switching circuit including at least one bidirectional conducting thyristor means effectively connected in series circuit relationship between each of said terminals and said high frequency link to thereby establish a plurality of circuit paths between said first and second terminals by synchronous conduction of different combinations of said thyristor means,
- said switching circuits further including a series capacitor commutation circuit for said thyristor means that is tuned to series resonance to generate a series of half sinusoidal current pulses as said switching circuits are operated at a high frequency switching rate,
- a firing circuit for sequentially rendering conductive selected combinations of said thyristor means, and
- a control computer for controlling said firing circuit including computation circuits for computing the net effective error according to a predetermined criterion between the instantaneous value of a predicted output waveform an a desired reference output waveform for each combination of thyristor means, and a selector circuit for determining the selected combination producing the minimum net effective error, said control computer operating immediately in advance of conduction of each current pulse.

26. A circuit according to claim 25 wherein both of said switching circuits are three-phase circuits, and
- said desired reference output waveform has a frequency different from that of the electric potential appearing at said first terminals.

27. A circuit according to claim 25 wherein one of said switching circuits is a single phase inverter.

28. A circuit according to claim 25 wherein at least one of said switching circuits has a pair of bidirectional conducting thyristor means connected effectively in parallel circuit relationship between each respective terminal and said high frequency link to provide dual circuit paths and increase the number of different combinations.

29. A circuit according to claim 25 wherein said high frequency link comprises a coupling capacitor, and said coupling capacitor has the dual function of being the commutating capacitor of said series capacitor commutation circuit.

30. The method of controlling a power converter circuit comprising first and second switching circuits with a single phase high frequency link therebetween connected respectively to a set of first terminals in which appears an electric potential and to a set of second terminals at which a desired output waveform is formed, wherein each switching circuit includes at least one solid state switching means effectively connected in series circuit relationship between each terminal and said high frequency link to establish a plurality of circuit paths between said first and second terminals by synchronous conduction of different combinations of said solid state switching means, said method comprising the steps of
- computing in a control computer the net effective error according to a predetermined criterion between the instantaneous value of a predicted output waveform and a reference output waveform for the different combinations of said solid state switching means, selecting the combination with the minimum net effective error, deriving control signals to render conductive the selected combination and generate an energy transfer pulse, and repeating the above steps to generate a series of minimum net effective error energy transfer pulses.

31. A method according to claim 30 including the steps of supplying to said control computer a reference output waveform corresponding to the desired output waveform to be formed at said second terminals, and sensing and supplying to said control computer predetermined electrical signals indicative of the state of said first and second switching circuits.

32. A method according to claim 30 including the step of providing a turn-off interval between consecutive energy transfer pulses, and performing the steps of computing the net effective error for each combination and selecting the next combination with the minimum net effective error during each turn-off interval.

33. A method according to claim 32 including the additional step of effectively sensing the cessation of each energy transfer pulse, and delaying the timing of the turn-off interval until each energy transfer pulse has ceased.

34. A method according to claim 30 including the step of computing also the net effective error when none of said solid state switching means is rendered conductive.

35. A method according to claim 30 including the step of changing said reference output waveform between consecutive energy transfer pulses to obtain an adjustable output waveform at said second terminals.

36. A method according to claim 30, wherein said power converter high frequency link comprises a coupling transformer, including the steps of computing the predicted transformer flux for each combination of said solid state switching means, and overriding the selection of any combination that causes saturation of the transformer flux.

37. A method according to claim 30 including the steps of computing the predicted current for each combination of said solid state switching means, and overriding the selection of any combination for which the predicted current rises above a predetermined maximum value.

* * * * *